United States Patent Office 3,645,913
Patented Feb. 29, 1972

3,645,913
REGENERATION OF COPPER OXIDE AND
COPPER CHROMITE CATALYSTS
Clarence E. Habermann, Midland, Mich., assignor to
The Dow Chemical Company, Midland, Mich.
No Drawing. Filed Dec. 5, 1969, Ser. No. 882,715
Int. Cl. B01j 11/30, 11/66
U.S. Cl. 252—416          8 Claims

ABSTRACT OF THE DISCLOSURE

The activity of a copper oxide or copper chromite catalyst deactivated while being used to convert a nitrile to the corresponding amide may be regenerated by oxidizing the used catalyst in an oxygen-containing gas at an elevated temperature and then contacting the oxidized copper oxide or copper chromite with a reducing agent such as hydrogen at an elevated temperature.

BACKGROUND OF THE INVENTION

In prior applications cited below, copper oxide and copper chromite have been demonstrated to be useful heterogeneous catalysts for converting nitriles to the corresponding amides. After a number of hours of use in such a reaction, however, the catalytic activity of the catalyst is substantially diminished. Most efficient use of such catalysts would require reactivation.

A limited number of other heterogeneous catalysts are known for the conversion of nitriles to amides, for example Haefele in U.S. Patent 3,366,639 and Watanabe in Bull. Chem. Soc. Japan, 37, 1325 (1964). There has been no suggestion of a method for regenerating such catalysts after use. As a practical matter, none of the catalysts shown in the art would be feasible without regeneration and longer life.

In a broader perspective, a number of methods of activating a spent catalyst are known. Such regeneration techniques are generally applicable only to a specific catalyst used in a specific process. As a result, regeneration techniques applicable to one catalyst useful in a particular reaction may not work for all catalysts useful in the reaction. Also, a particular method of reactivation of a specific catalyst may work when the catalyst is used in the presence of a particular substrate, but when the catalyst is employed after regeneration on another substrate or in another reaction, the reactivation technique may have no effect.

CROSS-REFERENCES TO RELATED
APPLICATIONS

The present application is a result of the continuing work with heterogeneous catalysts for converting nitriles to the corresponding amide described in previous applications by Clarence E. Habermann and Ben A. Tefertiller, Ser. No. 791,807, filed Jan. 16, 1969 and Ser. No. 835,765, filed June 23, 1969.

SUMMARY OF THE INVENTION

According to the present invention, a two-step process for regeneration of copper oxide and copper chromite which have been deactivated while being used to convert a nitrile to the corresponding amide has been discovered. In the first step of the process, the used catalyst is oxidized with an oxygen-containing gas at an elevated temperature, and then in the second step the catalyst is reduced with a suitable reducing agent such as a hydrogen-containing gas at an elevated temperature.

In the preferred process of the invention, the catalyst is contacted with air at a temperature of about 200° to about 350° C. for a few hours and then contacted with a hydrogen at a temperature of about 130° C. to about 250° C. for a few hours. By such preferred treatment, the catalyst may be restored to essentially the original activity without substantial degradation.

The copper chromite catalysts of the present invention are those generally referred to as the Adkins catalysts, either reduced or unreduced. These copper chromite catalysts may be prepared by a number of different procedures, for example, by the decomposition of copper ammonium chromate, by the decomposition of copper ammonium chromium carbonates, by the decomposition of copper-chromium nitrates or by grinding or heating together copper oxide and chromium oxides.

Prior to reactivation, the catalysts are deactivated by use in the conversion of essentially any nitrile having up to about 20 carbon atoms to the corresponding amide by contacting an aqueous solution of the nitrile with the catalyst under suitable reaction conditions. During the course of such hydrolysis reaction, the activity of the catalyst decreases. After a number of hours of use, the activity of the catalyst is relatively low and regeneration of the catalyst is desirable. Heretofore, no suitable technique has been known for the regeneration of such a catalyst to restore its activity in the conversion of a nitrile to an amide. By the use of the present invention, however, high activity and long catalyst life are restored.

The oxidation of the first step is suitably conducted with essentially any oxygen-containing gas. Such gases may suitably be pure oxygen or oxygen diluted with an inert diluent such as nitrogen, helium, argon, water or similar diluent. Of these oxygen-containing gases, air is preferred.

The extent of the oxidation of the spent catalyst may vary widely. Essentially any significant amount of oxidation gives an improved catalyst. As a rule, the used reduced catalysts gain weight during the oxidation and the gain in weight may provide a guide in monitoring the oxidation. In the preferred practice of the invention, the spent catalyst is usually oxidized until the weight remains essentially constant.

The elevated temperature at which the spent catalyst is oxidized may vary widely. Suitably temperatures of about 100° C. to about 500° C. are employed, with temperatures of about 150° to about 400° C. being preferred. When the catalyst is oxidized with air, temperatures of about 200° to about 350° C. are especially preferred.

The duration of the oxidation of the spent catalyst may vary widely. The extent of the oxidation is dependent upon the interrelationship of the amount of oxygen contacting the catalyst, the temperature of the oxidation and the duration of the oxidation. These three factors are adjusted to give the desired degree of oxidation. As more oxygen and higher temperatures are employed, the time of the oxidation may be reduced.

An exotherm is sometimes observed during the initial stages of the oxidation of the spent catalysts. This exotherm may cause uncontrollable oxidation if high temperatures or large quantities of oxygen are initially employed in the oxidation. To guard against an uncontrollable exotherm, reduced temperatures or diluted oxygen streams should be initially employed in the oxidation. As the oxidation proceeds, more oxygen and higher temperatures may subsequently be employed.

The reduction of second step in the reactivation of the catalyst is controlled by the interrelationship of the nature and amount of the reducing agent, and the temperature and duration of the reduction. The reduction of the oxidized copper oxide or copper chromite may be monitored by the loss of weight during reduction if the reducing agents and reduction products are removed. The weight loss for each individual catalyst may vary widely, but reduction under the conditions above generally removes about 2 to about 20% of the weight of the oxidized catalyst.

Although the reduction of the oxidized catalyst with hydrogen is preferred, other reducing agents may also be employed. For example, the reduced catalyst may be prepared by contacting the oxidized copper oxide or copper chromite at an elevated temperature with ammonia, hydrazine, carbon, carbon monoxide, a lower alkane or a lower alkanol or other reducing agents.

The temperature of the reduction may vary widely so long as the desired degree of reduction is obtained. Generally, temperatures of about 50° to about 500° C. are employed with temperatures of about 100° to about 300° C. being preferred. When hydrogen is employed as the reducing agent, temperatures of about 130° to about 250° C. are especially preferred.

The reduction of the catalyst may be conducted with essentially any amount of reducing agent and for essentially any period of time that gives a significant degree of reduction. At lower temperatures, large amounts of reducing agent and long periods of time are generally required, but within the preferred range of temperatures using hydrogen as a reducing agent, times of only a few hours are required to obtain the desired degree reduction.

Thus, using the process of the present invention, copper oxide and copper chromite catalysts that have been deactivated while being employed to convert nitriles to amides may be conveniently and inexpensively reactivated by oxidizing the catalyst with an oxygen-containing gas at an elevated temperature and then reducing the oxidized copper oxide or copper chromite with a suitable reducing agent such as hydrogen at an elevated temperature.

SPECIFIC EMBODIMENTS

Examples 1-10

A copper chromite catalyst was prepared by reducing a copper chromite catalyst containing 80% CuO and 17% $Cr_2O_3$ sold under the trade name Harshaw Cu 0203 in a stream of 20% hydrogen in nitrogen for 4 hours at 147° C. After using the catalyst to convert acrylonitrile to acrylamide over a number of hours in a continuous flow reactor, the catalyst activity was relatively low. Samples of this catalyst were tested and regenerated according to the invention as shown in Table I. Parallel experiments to determine the activity of all catalysts were performed in Pyrex glass ampoules by adding 1 gram of catalyst to the ampoule in a dry box, sealing the tube with a rubber serum cap and injecting five grams of a 7% acrylonitrile solution in water into the ampoule with a syringe. The ampoules were cooled in a NaCl-ice mixture, sealed off and then heated in a rocking autoclave at 80° C. for 1 hour. The reaction was quenched and the contents were analyzed by vapor phase chromatography. Examples 1-3 are included for comparison: Example 1 shows the activity of the original reduced catalyst; Example 2 hows the activity of the spent catalyst after it was used to convert acrylonitrile to acrylamide in a continuous flow reactor; and Example 3 shows the result when the spent catalyst is reduced with hydrogen without prior oxidation. Examples 4-10 show various embodiments of the present invention by air oxidation of the spent catalyst in a muffle furnace at the temperatures shown for 4 hours after which the oxidized copper chromite was reduced with a 640 cc. per minute flow of a 20% mixture of hydrogen in nitrogen at a temperature of 150° C. for 4 hours.

TABLE I.—REGENERATION OF A REDUCED COPPER CHROMITE CATALYST

| Example | Treatment | Percent Conversion, acrylonitrile | Yield, acrylamide | By-product [1] |
|---|---|---|---|---|
| 1 | Original catalyst reduced at 147° C. for 4 hours with 20% $H_2$. | 70.2 | 95.1 | 2.3 |
| 2 | Deactivated catalyst, no oxidation, no reduction | 14.7 | 34.8 | 15.4 |
| 3 | No oxidation; $H_2$ reduction | 53.3 | 89.3 | 0 |
| 4 | Air—150° C.; $H_2$ reduction | 59.9 | 94.3 | 0 |
| 5 | Air—200° C.; $H_2$ reduction | 61.6 | 92.7 | 0 |
| 6 | Air—250° C.; $H_2$ reduction | 73.2 | 93.9 | 0 |
| 7 | Air—300° C.; $H_2$ reduction | 70.0 | 95.0 | 0 |
| 8 | Air—350° C.; $H_2$ reduction | 69.2 | 87.6 | 0 |
| 9 | Air—400° C.; $H_2$ reduction | 64.8 | 89.6 | 0.9 |
| 10 | Air—500° C.; $H_2$ reduction | 58.9 | 89.8 | 1.0 |

[1] β-Hydroxy propionitrile.

In the same manner as described in the examples above, a used copper oxide or copper chromite catalyst that has not been originally reduced can be regenerated and activated according to the present invention. Also in the same manner, reduced and unreduced Adkins catalysts containing from 10 to 90% copper oxide and 90 to 10% by weight of chromium oxide can be regenerated as shown by Examples 4-10. Such reactivated catalysts may be used to convert acrylonitrile to acrylamide, benzonitrile to benzamide, adiponitrile to adipamide and other nitriles containing up to about 20 carbon atoms to the corresponding amide.

In the same manner as described by Examples 4-10, the oxidation of the used copper oxide or copper chromite may be conducted with oxygen in the presence of steam, helium, argon, or another inert gas. Moreover, in the same manner as described by Examples 4-10, the reduction of the catalyst subsequent to the oxidation may be conducted with hydrogen at temperatures from 50° to 500° C. or preferably from 130° to 250° C. Also, in the reduction step, other reducing agents may be employed such as carbon monoxide and hydrazine to effectuate a reduction similar to that obtained with hydrogen.

I claim:

1. A method of regenerating a copper oxide or copper chromite catalyst which has been deactivated while being used to convert a nitrile to the corresponding amide, by contacting an aqueous solution of said nitrile with said catalyst consisting essentially of oxidizing the used catalyst with an oxygen-containing gas at an elevated temperature the range of 150° to 350° C. and then reducing the oxidized copper oxide or copper chromite at an elevated temperature to remove about 2 to about 20% of the weight of said oxidized catalyst.

2. The process of claim 1 wherein the deactivated catalyst is oxidized in air.

3. The process of claim 2 wherein the temperature is 200° to 350° C.

4. The process of claim 1 wherein the oxidized copper oxide or copper chromite is reduced at a temperature of 50° to 500° C.

5. The process of claim 4 wherein the oxidized copper oxide or copper chromite is reduced at 100° to 300° C.

6. The process of claim 1 wherein the oxidized copper oxide or copper chromite is reduced with hydrogen.

7. The process of claim 6 wherein the oxidized copper oxide or copper chromite is reduced at a temperature of 130° to 250° C.

8. The process of claim 1 wherein a copper chromite catalyst is regenerated.

References Cited

UNITED STATES PATENTS

| | | | |
|---|---|---|---|
| 2,964,579 | 12/1960 | Kirsch et al. | 252—467 X |
| 2,397,705 | 4/1946 | Teter | 252—416 |
| 3,381,034 | 4/1968 | Greene et al. | 252—561 N |
| 3,062,883 | 11/1962 | Gilbert et al. | 252—561 R |

DANIEL E. WYMAN, Primary Examiner

P. E. KONOPKA, Assistant Examiner

U.S. Cl. X.R.

252—411, 419; 260—558 R, 561 R, 561 N